(12) United States Patent
Akamatsu et al.

(10) Patent No.: US 7,452,605 B2
(45) Date of Patent: *Nov. 18, 2008

(54) ARTICLE SUPERIOR IN SLIPPING WATERDROPS DOWN SURFACE THEREOF

(75) Inventors: Yoshinori Akamatsu, Mie (JP); Soichi Kumon, Mie (JP); Hiroaki Arai, Mie (JP); Shigeo Hamaguchi, Mie (JP); Yukihiro Ogitani, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/109,007

(22) Filed: Mar. 29, 2002

(65) Prior Publication Data

US 2003/0077457 A1 Apr. 24, 2003

(30) Foreign Application Priority Data

| Mar. 30, 2001 | (JP) | ............................. 2001-099491 |
| Mar. 30, 2001 | (JP) | ............................. 2001-099492 |
| Aug. 30, 2001 | (JP) | ............................. 2001-260705 |
| Jan. 15, 2002 | (JP) | ............................. 2002-005774 |
| Feb. 15, 2002 | (JP) | ............................. 2002-037626 |
| Mar. 5, 2002 | (JP) | ............................. 2002-058562 |

(51) Int. Cl.
  *B32B 9/04* (2006.01)
(52) U.S. Cl. ...................... 428/428; 428/429; 428/447; 428/448; 525/477; 528/42
(58) Field of Classification Search ............... 428/447; 106/287.12, 287.1; 528/34, 38, 42
See application file for complete search history.

(56) References Cited

U.S. PATENT DOCUMENTS

| 3,579,540 A | | 5/1971 | Ohlhausen et al. |
| 4,368,235 A | * | 1/1983 | Vaughn, Jr. ................. 428/412 |
| 5,457,148 A | | 10/1995 | Lucas |
| 5,624,997 A | * | 4/1997 | Liles et al. ................... 524/785 |
| 5,641,832 A | * | 6/1997 | Nagaoka ...................... 524/714 |
| 5,904,988 A | * | 5/1999 | Stein et al. ................... 428/447 |
| 5,929,159 A | * | 7/1999 | Schutt et al. ................. 524/544 |
| 6,403,225 B1 | * | 6/2002 | Narisawa et al. ............. 428/429 |
| 6,413,446 B1 | * | 7/2002 | Mechtel et al. .............. 252/181 |
| 6,451,437 B1 | * | 9/2002 | Amidaiji et al. ............. 428/447 |
| 6,566,443 B2 | * | 5/2003 | Morimoto et al. ........... 524/588 |

FOREIGN PATENT DOCUMENTS

| EP | 0903389 | | 3/1999 |
| EP | 1054047 | | 11/2000 |
| EP | 1101803 | | 5/2001 |
| EP | 1136539 | | 9/2001 |
| JP | 61-19660 A | | 1/1986 |
| JP | 63-63137958 A | * | 6/1988 |
| JP | 5301742 | | 11/1993 |
| JP | 8012375 | | 1/1996 |
| JP | 8-41342 A | | 2/1996 |
| JP | 11171594 | | 6/1999 |
| JP | 11181412 | | 7/1999 |
| JP | 11-300270 A | | 11/1999 |
| JP | 2000026758 | | 1/2000 |
| JP | 2000-144121 A | | 5/2000 |
| JP | 2000144056 | | 5/2000 |
| WO | 97/00995 | | 1/1997 |

OTHER PUBLICATIONS

Database WPI, Derwent Publications Limited, article No. XP002207454, Mar. 25, 1994.
Japanese Office Action dated Apr. 8, 2008 (Three (3) pages).

* cited by examiner

*Primary Examiner*—Marc S Zimmer
(74) *Attorney, Agent, or Firm*—Crowell & Moring LLP

(57) ABSTRACT

The invention relates to an article superior in slipping a waterdrop down a surface of the article. This article includes a substrate; and a functional film formed on a surface of the substrate. This functional film contains (a) a silica matrix; and (b) a component for providing the slipping. This component is dispersed in the silica matrix and contains a special, alkoxy group-terminated, dimethyl silicone.

38 Claims, No Drawings

ARTICLE SUPERIOR IN SLIPPING WATERDROPS DOWN SURFACE THEREOF

BACKGROUND OF THE INVENTION

The present invention relates to an article having a functional film superior in making waterdrops slip down the surface of the article. This article can be used for architectural and vehicular windowpanes, mirrors, and industrial glasses.

Various compositions (including silicone waxes, organopolysiloxanes, and surfactants) have been proposed in the course of improving waterdrop slippage capability.

U.S. Pat. No. 3,579,540, corresponding to Japanese Patent Examined Publication JP-B-50-15473, discloses a water repellent composition containing an alkylpolysiloxane and a mineral acid.

Japanese Patent Unexamined Publication JP-A-5-301742 discloses a water repellent agent for automotive window glass. This water repellent agent contains an amino-modified silicone oil and a surfactant.

JP-A-11-181412 discloses a surface treating agent containing a component that is a fluorine-containing silicone compound and/or its partial hydrolysate. This component contains a first essential unit in which a group (e.g., $—(CH_2)_3(CF_2)_7CH_3$ and $—(CH_2)_3(CF_2)_7CF_3$) is directly bonded to a silicon atom of an organosiloxane unit, and a second essential unit in which a group (e.g., $—(CH_2)_3SiCl_3$) is directly bonded to a silicon atom of an organosiloxane unit.

JP-A-2000-144056 discloses a surface treating liquid that is a mixture of (a) a first or second silicone compound, (b) an acid, and (c) a solvent containing water dissolved therein. The first silicone compound has a hydrolysable functional group at its end. The second silicone compound has a hydrolysable functional group at one end and a fluorolalkyl group at the other end.

JP-A-8-12375 discloses a water-repellent article prepared by applying a coating liquid to a substrate. This coating liquid is prepared by mixing together (a) a first solution obtained by hydrolyzing in a solvent a fluoroalkyl group-containing silane compound and another compound (polydimethylsiloxane and/or polydimethylsiloxane derivative) and (b) a second solution obtained by hydrolyzing in a solvent an alkoxysilane compound.

JP-A-2000-26758 discloses a coating composition containing as essential components (A) a hydroxyl group-containing vinyl polymer, (B) an epoxy group-terminated siloxane polymer, (C) a sulfonic acid compound, (D) a crosslinking agent component, and (E) a surfactant.

SUMMARY OF THE INVENTION

It is an object of the present invention to provide an article that is superior in making waterdrops slip down the surface of the article and in durability.

It is another object of the present invention to provide a process for producing the article.

It is still another object of the present invention to provide a coating liquid for producing the article.

According to the present invention, there is provided an article superior in slipping a waterdrop down a surface of said article. This article comprises a substrate; and a functional film formed on a surface of said substrate. This functional film comprises (a) a silica matrix, and (b) a component for providing said slipping. This component is dispersed in said silica matrix and comprises an alkoxy group-terminated, dimethyl silicone represented by the general formula [1] (hereinafter may be referred to as "dimethyl silicone [1]"),

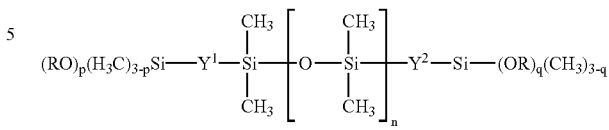

where each of $Y^1$ and $Y^2$ is independently a bivalent alkylene group, $—(CH_2)_i—NH—CO—O—$, or oxygen; R is a monovalent alkyl group; i is 0 or a positive integer; each of p and q is an integer of 1-3 independently; and n is an integer of not greater than 2,000. All the after-mentioned compounds may be referred to in a manner similar to the dimethyl silicone [1].

The component may further comprise a fluoroalkylsilane represented by the general formulas [2] or [3], $$CF_3(CF_2)_jCH_2CH_2Si(CH_3)_{3-k}Z_k \qquad [2]$$

where j is an integer of 0-11, k is an integer of 1-3, and Z is a hydrolysable group, $$Z_{t(H3C)3-t}Si—H_2CH_2C(CF_2)_sCH_2CH_2—Si(CH_3)_{3-u}Z_u \qquad [3]$$

where s is an integer of 0-12, each of t and u is independently an integer of 1-3, and Z is a hydrolysable group.

According to the present invention, there is provided a process for producing the article. This process comprises:

(a) subjecting an alkoxysilane to hydrolysis and polycondensation, thereby preparing a silica precursor sol for providing said silica matrix;

(b) mixing together said component and said silica precursor sol, thereby preparing a coating liquid;

(c) applying said coating liquid to said surface of said substrate, thereby forming thereon a precursory film; and (d) drying said precursory film into said functional film

DESCRIPTION OF THE PREFERRED EMBODIMENTS

In the invention, the silica matrix can be prepared from a silica precursor sol. This silica precursor sol can be prepared by hydrolysis and polycondensation of an alkoxysilane, as follows. For example, an alkoxysilane (e.g., tetraethoxysilane $[Si(OC_2H_5)_4]$) is mixed with a solvent, followed by stirring for a predetermined time (e.g., about 30 min), thereby obtaining a first solution. This solvent can be selected from lower alcohols (e.g., ethyl alcohol and isopropyl alcohol) and their mixtures. Furthermore, it can be selected from ethers and ketones. Separately, an acid aqueous solution is mixed with the solvent, followed by stirring for a predetermined time (e.g., about 30 min), thereby obtaining a second solution. Then, the first and second solutions are mixed together. Then, the mixture is stirred for a long time (e.g., about 15 hr) at room temperature to conduct hydrolysis and polycondensation of the alkoxysilane, thereby obtaining the target silica precursor sol. It is possible to conduct this hydrolysis by adding a small amount of water and a small amount of an acid catalyst (e.g., hydrochloric acid, nitric acid and acetic acid) to the alkoxysilane. The resulting hydrolysate is stirred at room temperature or under heating to conduct polycondensation of the hydrolysate, thereby obtaining a silica precursor sol. The process for producing the silica precursor sol is not limited to the above process. For example, it is possible to have a mild, uniform reaction by gradually adding a mixture of an acid aqueous solution and a solvent to a mixture of an alkoxysilane and a solvent.

Examples of the alkoxysilane for making the silica matrix are tetraalkoxysilanes (e.g., tetramethoxysilane, tetraethoxysilane, tetrapropoxysilane, and tetrabutoxysilane), trialkoxysilanes (e.g., methyltriethoxysilane, methyltrimethoxysilane, ethyltrimethoxysilane, ethyltriethoxysilane, propyltrimethoxysilane, and propyltriethoxysilane), and dialkoxysilanes. Of these, it is preferable to select one from tetramethoxysilane, tetraethoxysilane, and trialkoxysilanes (e.g., methyltriethoxysilane, methyltrimethoxysilane, ethyltrimethoxysilane, and ethyltriethoxysilane).

A first embodiment of the present invention will be described in detail in the following. According to the first embodiment, the alkoxy group-terminated, dimethyl silicone [1] may be a dimethyl silicone, that is, a reaction product prepared by reacting a silanol group-terminated, dimethyl silicone represented by the general formula [5] with an alkoxysilane represented by the general formula [6],

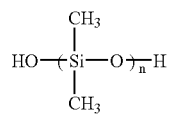

[5]

where n is defined as above,

[6]

where m is an integer of 1-3, OR is an alkoxy group, and Rx is a monovalent, straight chain, organic group terminated with an isocyanate group. The isocyanate group-containing alkoxysilane [6], which can be defined as a silane-coupling agent, is bonded to an end of the dimethyl silicone [5] through urethane bond (—NH—CO—O—), thereby producing the reaction product. In the functional film, the reaction product is dispersed or dissolved in the silica matrix and can provide a function of waterdrop slippage.

The silanol group-terminated, dimethyl silicone [5] may be one having an average polymerization degree of not greater than 1,000 and a molecular weight of not greater than 100,000. Its preferable average polymerization degree is in a range of 10-300. If it is less than 10, it may become too high in volatility. This may make it difficult to introduce the silanol group-terminated, dimethyl silicone into the coating liquid. If it is greater than 300, its compatibility with the silica precursor sol may become too low. This may make it difficult to form a transparent functional film.

Examples of the isocyanate group-containing alkoxysilane [6] are 3-isocyanatepropyltrialkoxysilane, 3-isocyanatepropylmethyldialkoxysilane, and 3-isocyanatepropyldimethylalkoxysilane, each having an isocyanate group as its end group.

According to the first embodiment, a process for producing the article comprises the steps of:

(a) mixing together the silanol group-terminated dimethyl silicone [5] and the isocyanate group-containing alkoxysilane [6] to bond them together through urethane bond, thereby synthesizing a reaction product (a silanated dimethylsilicone) between them;

(b) subjecting an alkoxysilane to hydrolysis and polycondensation, thereby preparing a silica precursor sol for providing the silica matrix;

(c) mixing together the silanated dimethylsilicone and the silica precursor sol, thereby preparing a coating liquid;

(d) applying the coating liquid to the surface of the substrate, thereby forming thereon a precursory film; and (e) drying the precursory film into the functional film.

The process for preparing the silanated dimethylsilicone solution is described in detail, as follows. This solution can be prepared by mixing together the silanol group-terminated, methyl silicone [5], the isocyanate group-containing alkoxysilane [6] (e.g., O=C=N—$C_3H_6$Si($OCH_3$)$_3$), a solvent, and if necessary a catalyst, followed by stirring. Upon this, it is assumed that a silanated dimethyl silicone having three alkoxy groups at its dimethylsilicone end is formed by a reaction between silanol group (—SiOH) of the silanol group-terminated, methyl silicone and isocyanate group (—N=C=O) of the isocyanate group-containing alkoxysilane. This reaction can be accelerated by adding a catalyst (e.g., Lewis bases and organic metal compounds). In particular, it is preferable to select one from organic tin compounds such as dibutyltin dilaurate, trimethyltin hydroxide and dimethyltin dichloride.

The diluting solvent for preparing the silanated dimethylsilicone is not particularly limited, as long as water solubility therein is very low and thereby it is substantially free of water. It may be selected from aromatic hydrocarbons (e.g., toluene, xylene and benzene), ketones (e.g., methyl ethyl ketone and methyl isobutyl ketone), esters (e.g., butyl acetate and hexyl acetate), ethers (e.g., diethyl ether and diisopropyl ether), and chlorine-containing solvents (e.g., chloroform and carbon tetrachloride).

Stirring for preparing the silanated dimethylsilicone solution can be conducted at room temperature for a period of time of 5-300 hr or 10-300 hr, preferably 10-100 hr or 30-100 hr. This stirring time can suitably be set depending on, for example, stirring temperature, catalyst used, and concentrations of the raw materials. If this stirring time is insufficient, it may become difficult to obtain the silanated dimethylsilicone. With this, the functional film may become inferior in durability of waterdrop slippage capability.

A second embodiment of the present invention will be described in detail in the following. According to the second embodiment, the component for providing the waterdrop slippage comprises the above-mentioned reaction product of the first embodiment and the fluoroalkylsilane represented by the general formula [2]. In fact, the reaction product and the fluoroalkylsilane [2] are bonded together, thereby forming a fluoroalkyl group-containing, dimethyl silicone. Due to the inclusion of the fluorolalkylsilane [2] in the component, the article according to the second embodiment is improved in durability. It is needless to say that all the above descriptions of the reaction product of the first embodiment (including those of the process for producing the reaction product) are also valid for the second embodiment, unless otherwise described hereinafter.

Examples of the fluoroalkylsilane [2] are $CF_3(CF_2)_{11}CH_2CH_2SiCl_3$, $CF_3(CF_2)_{11}CH_2CH_2SiCH_3Cl_2$, $CF_3(CF_2)_{11}CH_2CH_2Si(CH_3)_2Cl$, $CF_3(CF_2)_9CH_2CH_2SiCl_3$, $CF_3(CF_2)_9CH_2CH_2SiCH_3Cl_2$, $CF_3(CF_2)_9CH_2CH_2Si(CH_3)_2Cl$, $CF_3(CF_2)_7CH_2CH_2SiCl_3$, $CF_3(CF_2)_7CH_2CH_2SiCH_3Cl_2$, $CF_3(CF_2)_7CH_2CH_2Si(CH_3)_2Cl$, $CF_3(CF_2)_5CH_2CH_2SiCl_3$, $CF_3(CF_2)_5CH_2CH_2SiCH_3Cl_2$, $CF_3(CF_2)_5CH_2CH_2Si(CH_3)_2Cl$, $CF_3(CF_2)_3CH_2CH_2SiCl_3$, $CF_3(CF_2)_3CH_2CH_2SiCH_3Cl_2$, $CF_3(CF_2)_3CH_2CH_2Si(CH_3)_2Cl$, $CF_3CH_2CH_2SiCl_3$, $CF_3CH_2CH_2SiCH_3Cl_2$, $CF_3CH_2CH_2Si(CH_3)_2Cl$, $CF_3(CF_2)_{11}CH_2CH_2Si(OCH_3)_3$, $CF_3(CF_2)_{11}CH_2CH_2SiCH_3(OCH_3)_2$, $CF_3(CF_2)_{11}CH_2CH_2Si(CH_3)_2OCH_3$, $CF_3(CF_2)_9CH_2CH_2Si(OCH_3)_3$, $CF_3(CF_2)_9CH_2CH_2SiCH_3(OCH_3)_2$, CF$_3$(CF$_2$)$_9$CH$_2$CH$_2$Si(CH$_3$)$_2$OCH$_3$, CF$_3$(CF$_2$)$_7$CH$_2$CH$_2$Si(OCH$_3$)$_3$, CF$_3$(CF$_2$)$_7$CH$_2$CH$_2$SiCH$_3$(OCH$_3$)$_2$, CF$_3$(CF$_2$)$_7$CH$_2$CH$_2$Si(CH$_3$)$_2$OCH$_3$, CF$_3$(CF$_2$)$_5$CH$_2$CH$_2$Si(OCH$_3$)$_3$, CF$_3$(CF$_2$)$_5$CH$_2$CH$_2$SiCH$_3$(OCH$_3$)$_2$, CF$_3$(CF$_2$)$_5$CH$_2$CH$_2$Si(CH$_3$)$_2$OCH$_3$, CF$_3$(CF$_2$)$_3$CH$_2$CH$_2$Si(OCH$_3$)$_3$, CF$_3$(CF$_2$)$_3$CH$_2$CH$_2$SiCH$_3$(OCH$_3$)$_2$, CF$_3$(CF$_2$)$_3$CH$_2$CH$_2$Si(CH$_3$)$_2$OCH$_3$, CF$_3$CH$_2$CH$_2$Si(OCH$_3$)$_3$, CF$_3$CH$_2$CH$_2$SiCH$_3$(OCH$_3$)$_2$, and CF$_3$CH$_2$CH$_2$Si(CH$_3$)$_2$(OCH$_3$). Further examples of the fluoroalkylsilane [2] are fluoroalkylethoxysilanes, fluoroalkylpropoxysilanes, and fluoroalkylisocynatesilanes.

Examples of the hydrolysable group (X in the general formula [2]) of the fluoroalkylsilane [2] are alkoxy groups (e.g., methoxy group, ethoxy group, propoxy group, isopropoxy group, and butoxy group), chlorine group, and isocyanate group.

According to the second embodiment, a process for producing the article comprises the steps of:

(a) mixing together the silanol group-terminated dimethyl silicone [5] and the isocyanate group-containing alkoxysilane [6] to bond them together through urethane bond, thereby synthesizing a reaction product (a silanated dimethylsilicone) between them;

(b) reacting the silanated dimethylsilicone with the fluoroalkylsilane [2], thereby synthesizing a fluoroalkyl group-containing dimethyl silicone;

(c) subjecting an alkoxysilane to hydrolysis and polycondensation, thereby preparing a silica precursor sol for providing the silica matrix;

(d) mixing together the fluoroalkyl group-containing dimethyl silicone of the step (b) and the silica precursor sol, thereby preparing a coating liquid;

(e) applying the coating liquid to the surface of the substrate, thereby forming thereon a precursory film; and (f) drying the precursory film into the functional film.

In the second embodiment, the step (b) can be conducted by adding the fluoroalkylsilane [2], which has an end alkoxy group(s), to the silanated dimethylsilicone solution, followed by adding an acid aqueous solution to the reaction mixture and then stirring. With this, the alkoxy groups of the silanated dimethylsilicone and of the fluoroalkylsilane [2] are hydrolyzed to form silanol groups. After the stirring, water is removed from the reaction mixture. With this, the hydrolyzed dimethylsilicone and the hydrolyzed fluoroalkylsilane are bonded together through dehydration and condensation, thereby forming a fluoroalkyl group-containing dimethyl silicone.

In case that the fluoroalkylsilane [2] contains chlorine as the reactive end group (i.e., Z in the general formula [2]), the step (b) of the second embodiment can be conducted by adding an acid aqueous solution to the silanated dimethyl silicone solution, followed by stirring to hydrolyze the silanated dimethyl silicone. With this, alkoxy group of the silanated dimethyl silicone is hydrolyzed to from silanol group. After the stirring, water is removed from the reaction mixture, followed by adding the fluoroalkylchlorosilane [2] to the reaction mixture and then stirring. With this, the hydrolyzed dimethyl silicone and the fluoroalkylchlorosilane are bonded together through dehydrochlorination (i.e., HCl removal), thereby forming a fluoroalkyl group-containing dimethyl silicone.

In the step (b) of the second embodiment, the removal of water from the reaction mixture may be conducted, for example, by adding a synthetic zeolite (e.g., molecular sieves 3A and 4A). The fluoroalkylsilane [2] used may be in an amount of 0.1-6 moles per mol of the silanated dimethyl silicone. Furthermore, it is preferably in an amount of 0.5-3 moles in view of its compatibility with the silica precursor sol.

As stated above, the coating liquid according to the first and second embodiments can be prepared by mixing together the silanated dimethyl silicone solution and the silica precursor sol. In contrast with this, it is not preferable to mix together the silanol group-terminated, dimethyl silicone, the isocyanate group-containing alkoxysilane and the silica precursor sol at the same time in the preparation of the coating liquid. With this mixing, the functional film may become inferior in durability of waterdrop slippage capability.

In the first and second embodiments, the silanol group-terminated, dimethyl silicone are bonded with the isocyanate group-containing alkoxysilane through urethane bond, thereby producing the reaction product (the silanated dimethyl silicone composition) having one, two or three alkoxy groups at its silicone end. This reaction product is improved in compatibility with the silica precursor sol. Therefore, it is possible to disperse or contain a large amount of the reaction product in the silica matrix. The resulting article is improved in waterdrop slippage capability and its durability. The article according to the second embodiment is further improved in durability by inclusion of the fluoroalkyl group of the fluoroalkylsilane [2] into the silanated dimethyl silicone.

A third embodiment of the present invention will be described in detail in the following. According to the third embodiment, the alkoxy group-terminated, dimethyl silicone [1] of the component may be an alkoxy group-terminated, dimethyl silicone represented by the general formula [4]

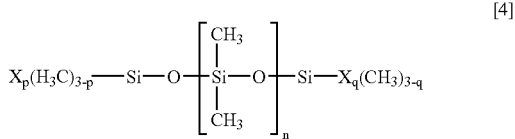

[4]

where p, q and n are defined as in the general formula [1], and X is —OR or —R'Si(OR)$_r$(CH$_3$)$_{3-r}$, where R is a monovalent alkyl group, R' is a bivalent alkylene group, and r is an integer of 1-3. This dimethyl silicone [4], in which a silicon atom (bonded to an alkoxy group) is bonded to a dimethyl silicone chain either directly or indirectly through methylene group, is strongly held in the silica matrix, thereby improving the article in durability.

The dimethyl silicone [4] having at least one alkoxy group at each end can be used in the invention. In fact, the number of the alkoxy groups in the dimethyl silicone [4] is preferably at least 4. If it is 3 or less, the dimethyl silicone [4] may not be strongly held in the silica matrix, thereby lowering the article in durability. The dimethyl silicone [4] used in the third embodiment may be one having an average polymerization degree of not greater than 2,000 and a molecular weight of not greater than about 150,000. The dimethyl silicone [1] or [4] has an average polymerization degree preferably in a range of 5-400. If it is less than 5, it may become too high in volatility. This may make it difficult to introduce the dimethyl silicone [1] or [4] into the coating liquid. If it is greater than 400, its compatibility with the silica precursor sol may become too low. This may make it difficult to form a transparent functional film.

In the general formula [4], R may be an alkyl group having a carbon atom number of 1-6, such as methyl, ethyl, propyl, isopropyl, butyl, pentyl, hexyl and cyclohexyl groups. Of these, methyl and ethyl groups are preferable. R' in the general formula [4] may be a bivalent alkylene group having a carbon atom number of 2-4, such as ethylene, propylene, isopropylene and butylene groups. Of these, ethylene is preferable.

According to the third embodiment, a process for producing the article comprises the steps of:

(a) subjecting an alkoxysilane to hydrolysis and polycondensation, thereby preparing a silica precursor sol for providing the silica matrix;

(b) mixing together the alkoxy group-terminated, dimethyl silicone [4] and the silica precursor sol, thereby preparing a coating liquid;

(c) applying the coating liquid to the surface of the substrate, thereby forming thereon a precursory film; and (d) drying the precursory film into the functional film.

Fourth and fifth embodiments of the present invention will be described in detail in the following. According to the fourth embodiment, the component for providing the waterdrop slippage comprises a mixture of the alkoxy group-terminated, dimethyl silicone [1] or [4] and the fluoroalkylsilane [2]. These dimethyl silicone [1] or [4] and fluoroalkylsilane [2] may be bonded together. This dimethyl silicone [4], in which a silicon atom (bonded to alkoxy group) is bonded to an end silicon atom of a dimethylsiloxane chain through oxygen or methylene group, is strongly held in the silica matrix, thereby improving the article in durability. Furthermore, the article according to the fourth embodiment is further improved in durability by the inclusion of the fluoroalkylsilane [2] in the silica matrix. It is needless to say that all the above descriptions of the alkoxy group-terminated, dimethyl silicone [4] of the third embodiment are also valid for the fourth and fifth embodiments and that all the above descriptions of the fluoroalkylsilane [2] of the second embodiment are also valid for the fourth embodiment, unless otherwise described hereinafter.

The dimethyl silicone [4] used in the fourth and fifth embodiments may be one having an average polymerization degree of not greater than 2,000, preferably 5-1,000. If it is greater than 2,000, its compatibility with the silica precursor sol may become too low. This may make it difficult to form a transparent functional film.

The dimethyl silicone [1] or [4] having at least one alkoxy group at each end can be used in the fourth and fifth embodiments. In fact, the number of the alkoxy groups in the dimethyl silicone [1] or [4] is preferably at least 3. If it is 2 or less, its compatibility with the silica precursor sol may become inferior. This may make it difficult to form a precursor film on the substrate. Furthermore, the dimethyl silicone [1] or [4] may not be strongly held in the silica matrix, thereby lowering the article in durability.

The dimethyl silicone [4] is in an amount of preferably 1-200 wt % based on the solid matter (in terms of $SiO_2$) weight of the silica precursor sol. If it is less than 1 wt %, the amount of the dimethyl silicone in the functional film may become insufficient. With this, the article may become inferior in waterdrop slippage capability. If it is greater than 200 wt %, its compatibility with the silica precursor sol may become inferior. This may make it difficult to form a transparent functional film.

In the fourth embodiment, the amount of the fluoroalkylsilane [2] may be in an amount of 10-3,000 mol % or 10-2,000 mol % based on the total number of moles of the dimethyl silicone. If it is less than 10 mol %, the amount of the fluoroalkylsilane [2] may become insufficient in the functional film, thereby lowering the functional film in durability. If it is greater than 3,000 mol %, its compatibility with the silica precursor sol may become too low. This may make it difficult to form a transparent functional film.

According to the fourth embodiment, a process for producing the article comprises the steps of:

(a) subjecting an alkoxysilane to hydrolysis and polycondensation, thereby preparing a silica precursor sol for providing the silica matrix;

(b) mixing together the alkoxy group-terminated, dimethyl silicone [4], the fluoroalkylsilane [2] and the silica precursor sol, thereby preparing a coating liquid;

(c) applying the coating liquid to the surface of the substrate, thereby forming thereon a precursory film; and (d) drying the precursory film into the functional film.

According to the fifth embodiment, the component for providing the waterdrop slippage comprises the alkoxy group-terminated, dimethyl silicone [1] or [4] and the fluoroalkylsilane represented by the general formula [3]. These dimethyl silicone [4] and fluoroalkylsilane [3] may be bonded together. Due to the use of the fluoroalkylsilane [3], having hydrolysable groups (e.g., trialkoxy group) at its both ends, it is unexpectedly possible to obtain a highly transparent functional film even if the silica precursor concentration, the silicone concentration (its weight ratio to the silica precursor) and the fluoroalkylsilane (FAS) concentration of the coating liquid are increased. The fluoroalkylsilane [3] preferably has at least three hydrolysable groups in the molecule. Furthermore, the article according to the fifth embodiment is further improved in durability (light resistance and acid resistance) by the inclusion of the fluoroalkylsilane [3] in the silica matrix. Since the fluoroalkylsilane [3] containing hydrolysable groups at its both ends can be added in a large amount in the preparation of the coating liquid, it becomes possible to further improve the functional film in durability.

The dimethyl silicone [1] or [4] of the fifth embodiment is in an amount of preferably 1-300 wt % based on the solid matter (in terms of $SiO_2$) weight of the silica precursor sol. This solid matter weight is the same as the resulting silica matrix weight. If it is less than 1 wt %, the amount of the dimethyl silicone in the functional film may become insufficient. With this, the article may become inferior in waterdrop slippage capability. If it is greater than 300 wt %, its compatibility with the silica precursor sol may become inferior. This may make it difficult to form a transparent functional film.

In the fifth embodiment, examples of the fluoroalkylsilane [3] are $Cl_3SiCH_2CH_2(CF_2)_{12}CH_2CH_2SiCl_3$, $Cl_2(CH_3)SiCH_2CH_2(CF_2)_{12}CH_2CH_2Si(CH_3)Cl_2$, $Cl(CH_3)_2SiCH_2CH_2(CF_2)_{12}CH_2CH_2Si(CH_3)_2Cl$, $Cl_3SiCH_2CH_2(CF_2)_{10}CH_2CH_2SiCl_3$, $Cl_2(CH_3)SiCH_2CH_2(CF_2)_{10}CH_2CH_2Si(CH_3)Cl_2$, $Cl(CH_3)_2SiCH_2CH_2(CF_2)_{10}CH_2CH_2Si(CH_3)_2Cl$, $Cl_3SiCH_2CH_2(CF_2)_8CH_2CH_2SiCl_3$, $Cl_2(CH_3)SiCH_2CH_2(CF_2)_8CH_2CH_2Si(CH_3)Cl_2$, $Cl(CH_3)_2SiCH_2CH_2(CF_2)_8CH_2CH_2Si(CH_3)_2Cl$, $Cl_3SiCH_2CH_2(CF_2)_6CH_2CH_2SiCl_3$, $Cl_2(CH_3)SiCH_2CH_2(CF_2)_6CH_2CH_2Si(CH_3)Cl_2$, $Cl(CH_3)_2SiCH_2CH_2(CF_2)_6CH_2CH_2Si(CH_3)_2Cl$, $Cl_3SiCH_2CH_2CF_2CH_2CH_2SiCl_3$, $Cl_2(CH_3)SiCH_2CH_2CF_2CH_2CH_2Si(CH_3)Cl_2$, $Cl(CH_3)_2SiCH_2CH_2CF_2CH_2CH_2Si(CH_3)_2Cl$, $(CH_3O)_3SiCH_2CH_2(CF_2)_{12}CH_2CH_2Si(OCH_3)_3$, $(CH_3O)_2(CH_3)SiCH_2CH_2(CF_2)_{12}CH_2CH_2Si(CH_3)(OCH_3)_2$, $(CH_3O)(CH_3)_2SiCH_2CH_2(CF_2)_{12}CH_2CH_2Si(CH_3)_2(OCH_3)$, $(CH_3O)_3SiCH_2CH_2(CF_2)_{10}CH_2CH_2Si(OCH_3)_3$, $(CH_3O)_2(CH_3)SiCH_2CH_2(CF_2)_{10}CH_2CH_2Si(CH_3)(OCH_3)_2$, $(CH_3O)(CH_3)_2SiCH_2CH_2(CF_2)_{10}CH_2CH_2Si(CH_3)_2(OCH_3)$, $(CH_3O)_3SiCH_2CH_2(CF_2)_8CH_2CH_2Si(OCH_3)_3$, $(CH_3O)_2(CH_3)SiCH_2CH_2(CF_2)_8CH_2CH_2Si(CH_3)(OCH_3)_2$, $(CH_3O)(CH_3)_2SiCH_2CH_2(CF_2)_8CH_2CH_2Si(CH_3)_2(OCH_3)$, $(CH_3O)_3SiCH_2CH_2(CF_2)_6CH_2CH_2Si(OCH_3)_3$, $(CH_3O)_2$ (CH$_3$)SiCH$_2$CH$_2$(CF$_2$)$_6$CH$_2$CH$_2$Si(CH$_3$)(OCH$_3$)$_2$, (CH$_3$O)(CH$_3$)$_2$SiCH$_2$CH$_2$(CF$_2$)$_6$CH$_2$CH$_2$Si(CH$_3$)$_2$(OCH$_3$), (CH$_3$O)$_3$SiCH$_2$CH$_2$CF$_2$CH$_2$CH$_2$Si(OCH$_3$)$_3$, (CH$_3$O)$_2$(CH$_3$)SiCH$_2$CH$_2$CF$_2$CH$_2$CH$_2$Si(CH$_3$)(OCH$_3$)$_2$, and (CH$_3$O)(CH$_3$)$_2$SiCH$_2$CH$_2$CF$_2$CH$_2$CH$_2$Si(CH$_3$)$_2$(OCH$_3$). Further examples of the fluoroalkylsilane [3] are fluoroalkylethoxysilanes, fluoroalkylpropoxysilanes, and fluoroalkylisocyanatesilanes. Examples of the hydrolysable group (Z in the general formula [3]) are alkoxy groups (e.g., methoxy group, ethoxy group, propoxy group, isopropoxy group, and butoxy group), chlorine group, and isocyanate group.

In the fifth embodiment, the amount of the fluoroalkylsilane [3] may be in an amount of 10-3,000 mol % based on the total number of moles of the dimethyl silicone [1] or [4]. If it is less than 10 mol %, the amount of the fluoroalkylsilane [3] may become insufficient in the functional film, thereby lowering the functional film in durability. If it is greater than 3,000 mol %, its compatibility with the silica precursor sol may become too low. This may make it difficult to form a transparent functional film.

According to the fifth embodiment, a process for producing the article comprises the steps of:

a) subjecting an alkoxysilane to hydrolysis and polycondensation, thereby preparing a silica precursor sol for providing the silica matrix;

(b) mixing together the alkoxy group-terminated, dimethyl silicone [1] or [4], the fluoroalkylsilane [3] and the silica precursor sol, thereby preparing a coating liquid;

(c) applying the coating liquid to the surface of the substrate, thereby forming thereon a precursory film; and (d) drying the precursory film into the functional film.

In the invention, a solvent used in the step of preparing the coating liquid may be selected from lower alcohols (e.g., ethanol and isopropyl alcohol), ketones (e.g., methyl ethyl ketone, methyl isobutyl ketone), esters (e.g., ethyl acetate and butyl acetate), aromatic hydrocarbons (e.g., toluene, benzene and xylene), ethers (e.g., diethyl ether and diisopropyl ether), chlorine-containing solvents (e.g., chloroform and carbon tetrachloride), and mixtures of these.

In the invention, the coating liquid may be applied to a substrate by hand brushing, nozzle flow coating, dip coating, spraying, reverse coating, flexography, screen printing, flow coating, spin coating, or a combination of these. The coating liquid may be packaged as a commercial water-repellent agent by putting it into a bottle equipped with a spray nozzle.

The precursory film formed on the substrate may be air-dried at room temperature or heated at a temperature of 600° C. or lower after or upon air-drying. If this temperature exceeds 600° C., the component for waterdrop slippage may be pyrolyzed. With this, the functional film may become substantially inferior in waterdrop slippage.

The substrate is not limited to particular materials. It may be glass or resin. It is typically a glass plate, which can be selected from float glass plates for automotive and architectural uses and glass plates produced by rollout method, clear and various color glass plates, various functional glass plates, tempered glass plates, laminated glass plates, double-layered glass plates, and flat and bent glass plates. The functional film may be formed on both major surfaces of a substrate.

It is optional to form an underlayer (made of a metal oxide) between the substrate and the functional film. If the substrate is a glass plate, the underlayer may be an oxide thin film containing as a main component a metal oxide (e.g., silicon oxide). The resulting article is improved in durability.

The following nonlimitative Examples are illustrative of the present invention. In fact, Examples 1-4, 5-9, 10-14, 15-19, and 20-21 are respectively illustrative of the first to fifth embodiments of the present invention.

EXAMPLE 1

(1) Synthesis of a Silanated Dimethyl Silicone

As shown in Table 1, a silanated dimethyl silicone was synthesized by reacting a silanol group-terminated, dimethyl silicone [abbreviated as N24SOL(OH); DMS-S15 (trade name) of Gelest Co.] having an average polymerization degree of 24 and an average molecular weight of 1,750 with 3-isocyanatepropyltrimethoxysilane [O=C=N—C$_3$H$_6$Si(OCH$_3$)$_3$] as a silane-coupling agent in the presence of dibutyltin dilaurate as a catalyst, as follows.

2.00 g of the silanol group-terminated dimethyl silicone and 20.00 g of toluene were mixed together, followed by stirring for about 1 min, then adding 0.04 g of dibutyltin dilaurate and then stirring for about 5 min. Then, 3-isocyanatepropyltrimethoxysilane was added to the mixture so that the equivalent ratio of isocyanate group (—N=C=O) to silanol group (—SiOH) of the silanol group-terminated dimethyl silicone was 1:1, followed by stirring for 2 days at room temperature. The resulting solution was analyzed to determine its FT-IR spectrum. With this, it was found that a peak strength originating from —N=C=O group appearing at about 2,200 cm$^{-1}$ has decreased. Therefore, it was confirmed that a silanated dimethyl silicone having three alkoxy groups at its end was formed by a reaction between —SiOH of the silanol group-terminated dimethyl silicone and —N=C=O of the 3-isocyanatepropyltrimethoxysilane.

(2) Preparation of a Silica Precursor Sol

A silica precursor sol was prepared by hydrolysis and polycondensation of tetraethoxysilane (abbreviated as TEOS) [Si(OC$_2$H$_5$)$_4$], as follows. At first, 312.5 g of TEOS and 450.0 g of EKINEN F-1 (trade name) of Kishida Chemical Co. were mixed together, followed by stirring for about 30 min, thereby obtaining a first solution. EKINEN F-1 is a mixture of 90 wt % ethanol and 10 wt % isopropyl alcohol. Separately, 7.5 g of 0.1 mol/l nitric acid aqueous solution, 210.0 g of H$_2$O, and 20.0 g of EKINEN F-1 were mixed together, followed by stirring for about 30 min, thereby obtaining a second solution. The resulting first and second solutions were mixed together, followed by stirring for about 15 hr at room temperature, thereby obtaining a silica precursor sol.

(3) Coating Liquid Preparation

At first, 0.25 g of the silanated dimethyl silicone solution and 7.00 g of methyl ethyl ketone were mixed together, followed by stirring for about 5 min. Then, 2.00 g of the silica precursor sol were added to the mixture, followed by stirring for about 15 hr at room temperature, thereby preparing a coating liquid.

(4) Glass Substrate Washing

A surface of a float glass (dimensions: 100 mm×100 mm×2 mm) was abraded with an abrasive liquid and then washed and dried with a glass washer. This abrasive liquid contained about 1 wt % of a commercial glass abrasive agent, MIREK E of Mitsui Kinzoku Kogyo Co., suspended in water thereof.

(5) Formation of a Functional Film

The coating liquid prepared as above was applied by spin coating to the glass substrate washed as above, as follows. At first, the glass substrate was placed on a spin coater. While the glass substrate was rotated at a rotation speed of 500 rpm, the coating liquid was dropped in an amount of about 1.0-1.5 ml to the glass substrate. This rotation speed was maintained for 30 seconds to dry the coated film. With this, a transparent gel film was formed. Then, it was subjected to a heat treatment at 300° C. for 10 min, followed by cooling down to room temperature, then washing with water in flowing water using a flannel (made of cotton No. 300), and then air-drying, thereby forming a functional film on the glass substrate.

The functional film formed on the glass substrate was subjected to the following evaluation tests. The results are shown in Table 2.

Evaluation Tests

The contact angle of a water drop (about 2 μl of pure water) on the functional film, that is, the initial contact angle, was measured in the atmosphere of about 25° C., by a CA-X type contact angle meter made by Kyowa Kaimen Kagaku Co.

While the test piece (the coated glass substrate) was inclined 30 degrees to horizontal, pure water was slowly dropped onto the functional film from a microsyringe to form a waterdrop. At the time when this waterdrop started to move at a speed of 2 mm/s or greater during its growth, the amount of the dropped pure water (i.e., the volume of the waterdrop) was recorded as "waterdrop volume to start slippage". The functional film was judged as being satisfactory in waterdrop slippage capability, if the dropped pure water is in an amount of 15 microliters or less. It is preferably 10 microliters or less.

While the test piece was maintained horizontally, a waterdrop of pure water (50 μl) was dropped onto the functional film. Then, the test piece was gradually inclined, and the angle of inclination to make the waterdrop start falling down thereon was measured in the atmosphere of about 25° C. using a CA-A type angle meter made by Kyowa Kaimen Kagaku Co. The functional film was judged as being satisfactory in waterdrop slippage capability, if the angle is 10 degrees or less. It is preferably 5 degrees or less.

The test piece was subjected to an abrasion resistance test. In this test, a flannel (made of cotton No. 300) was manually rubbed against the test piece until 120 reciprocations in flowing water. After this test, the test piece was again subjected to the above-mentioned three evaluation tests.

TABLE 1

|  | Average Polymerization Degree of Silicone | Use of Silane-Coupling Agent | Use of Silica Precursor Sol |
| --- | --- | --- | --- |
| Ex. 1 | 24 | Yes | Yes |
| Ex. 2 | 56 | Yes | Yes |
| Ex. 3 | 70 | Yes | Yes |
| Ex. 4 | 243 | Yes | Yes |
| Com. Ex. 1 | 70 | No | Yes |
| Com. Ex. 2 | 70 | Yes | No |

TABLE 2

|  | Initial Measurements Before Abrasion Resistance Test | | | Measurements After Abrasion Resistance Test | | |
| --- | --- | --- | --- | --- | --- | --- |
|  | Contact Angle (°) | Waterdrop Volume to Start Slippage (μl) | Inclination Angle for Waterdrop Slippage Start (°) | Contact Angle (°) | Waterdrop Volume to Start Slippage (μl) | Inclination Angle for Waterdrop Slippage Start (°) |
| Ex. 1 | 98 | 14 | 7 | 98 | 12 | 5 |
| Ex. 2 | 103 | 12 | 5 | 103 | 10 | 4 |
| Ex. 3 | 102 | 12 | 5 | 101 | 12 | 5 |
| Ex. 4 | 103 | 15 | 9 | 102 | 12 | 5 |
| Com. Ex. 1 | 104 | 5 | 1 | 102 | 20 | 10 |
| Com. Ex. 2 | 95 | 45 | 18 | 81 | 38 | 17 |

EXAMPLE 2

Example 1 was repeated except in that the silanol group-terminated, dimethyl silicone was replaced with one (abbreviated as N56SOL(OH)) having an average polymerization degree of 56 and an average molecular weight of 4,200, DMS-S21 (trade name) of Gelest Co.

EXAMPLE 3

Example 1 was repeated except in that the silanol group-terminated, dimethyl silicone was replaced with one (abbreviated as N70SOL(OH)) having an average polymerization degree of 70 and an average molecular weight of 5,200, YF3800 (trade name) of Toshiba Silicone Co.

EXAMPLE 4

Example 1 was repeated except in that the silanol group-terminated, dimethyl silicone was replaced with one (abbreviated as N243SOL(OH)) having an average polymerization degree of 243 and an average molecular weight of 18,000, DMS-S27 (trade name) of Gelest Co.

COMPARATIVE EXAMPLE 1

Example 1 was repeated except in that a coating liquid was prepared by dissolving 2.00 g of a silanol group-terminated, dimethyl silicone (abbreviated as N70SOL(OH); average polymerization degree: 70; average molecular weight of 5,200) in 20.00 g of toluene. In other words, the use of the silane-coupling agent was omitted.

COMPARATIVE EXAMPLE 2

A silanated dimethyl silicone solution was prepared in the same manner as that of Example 1 except that a silanol group-terminated, dimethyl silicone (abbreviated as N70SOL(OH); average polymerization degree: 70; average molecular weight of 5,200) was used as the starting material. Then, 5.50 g of the silanated dimethyl silicone solution, 7.50 g of iso-propyl alcohol (iPA) and 0.10 g of a 0.1 mol/l nitric acid aqueous solution were mixed together, followed by stirring at 25° C. for 3 hr, thereby obtaining a solution. In other words, the use of the silica precursor sol was omitted. Then, 0.5 ml of the obtained solution were dropped onto a glass substrate. Then, the dropped solution was extended over the entire surface of the glass substrate with a cotton cloth (trade name:

BENKOT), followed by air-drying for about 5 minutes. Then, the coated glass substrate was subjected to a heat treatment at 80° C. for 10 minutes in a muffle furnace. A white-haze remainder (derived from the solution) on the glass substrate was removed by wiping with isopropyl alcohol, thereby obtaining a transparent test piece. This test piece was subjected to the same evaluation tests, and the results are shown in Table 2.

EXAMPLE 5

(1) Synthesis of a Silanated Dimethyl Silicone

As shown in Table 3, a silanated dimethyl silicone was synthesized in the same manner as that of Example 1 except that a silanol group-terminated, dimethyl silicone (YF3800 (trade name) of Toshiba Silicone Co.) having an average polymerization degree of 70 and an average molecular weight of 5,200 was used as the starting material.

(2) Synthesis of a Fluoroalkyl Group-containing, Silanated, Dimethyl Silicone

The target dimethyl silicone was synthesized by reacting the obtained silanated dimethyl silicone solution with a fluoroalkylsilane, as follows.

As shown in Table 3, 4.08 g of the silanated dimethyl silicone solution, 20.00 g of ethyl acetate, and 0.02 g of a 0.1 mol/l nitric acid aqueous solution were mixed together, followed by stirring at room temperature for about 5 hr. Then, 4.00 g of molecular sieve 4A made by Kishida Chemical Co. were added to the reaction mixture, following by standing still for about 20 hr to remove water from the reaction mixture. Then, 22.40 g of the resulting solution were mixed with 0.05 g of heptadecafluorodecyltrichlorosilane ($CF_3(CF_2)_7CH_2CH_2SiCl_3$, abbreviated as C8FASC), HFTCS (trade name) of Shin-Etsu Chemical Co., followed by stirring at room temperature for about 24 hr, thereby synthesizing a fluoroalkyl group-containing, silanated, dimethyl silicone.

(3) Preparation of a Silica Precursor Sol

A silica precursor sol was prepared in the same manner as that of Example 1.

(4) Coating Liquid Preparation

At first, 1.50 g of the fluoroalkyl group-containing, silanated, dimethyl silicone solution and 7.00 g of methyl ethyl ketone were mixed together, followed by stirring for about 5 min. Then, 2.00 g of the silica precursor sol were added to the mixture, followed by stirring for about 15 hr at room temperature, thereby preparing a coating liquid.

(5) Glass Substrate Washing

A float glass as the glass substrate was washed in the same manner as that of Example 1.

(6) Formation of a Functional Film

A functional film was formed on the glass substrate in the same manner as that of Example 1.

Evaluation Tests

The functional film formed on the glass substrate was subjected to the same evaluation tests as those of Example 1. The functional film was judged as being satisfactory in waterdrop slippage capability, if the dropped pure water is in an amount of 20 microliters or less. Furthermore, it was judged as being satisfactory in waterdrop slippage capability, if the angle is 10 degrees or less. Furthermore, it was subjected to the following evaluation tests. The results are shown in Table 4.

The test piece was subjected to a light resistance test. In this test, the test piece was irradiated with a 1.5 kW metal halide lamp, M015-L312 (trade name) of Eye Graphics Co., for 12 hr. After this test, the test piece was again subjected to the above-mentioned three evaluation tests of Example 1.

The test piece was subjected to an acid resistance test. In this test, 1 ml of 25% sulfuric acid aqueous solution was dropped onto the test piece, followed by standing still for 24 hr at about 25° C. After that, the surface of the test piece was washed with tap water and then air-dried. After this test, the test piece was again subjected to the above-mentioned three evaluation tests of Example 1.

TABLE 3

| | Average Polymerization Degree of Silicone | Use of Silane-Coupling Agent | Fluoro-alkylsilane | Use of Silica Precursor Sol |
|---|---|---|---|---|
| Ex. 5 | 70 | Yes | C8FASC | Yes |
| Ex. 6 | 70 | Yes | C10FASC | Yes |
| Ex. 7 | 70 | Yes | C4FASC | Yes |
| Ex. 8 | 70 | Yes | C1FASC | Yes |
| Ex. 9 | 70 | Yes | C1FASMC | Yes |
| Com. Ex. 3 | 70 | No | C8FASC | Yes |
| Com. Ex. 4 | 70 | Yes | C8FASC | No |

TABLE 4

| | Initial Measurements | | | Measurements After Light Resistance Test | | | Measurements After Acid Resistance Test | | |
|---|---|---|---|---|---|---|---|---|---|
| | Contact Angle (°) | Waterdrop Volume to Start Slippage (µl) | Inclination Angle for Waterdrop Slippage Start (°) | Contact Angle (°) | Waterdrop Volume to Start Slippage (µl) | Inclination Angle for Waterdrop Slippage Start (°) | Contact Angle (°) | Waterdrop Volume to Start Slippage (µl) | Inclination Angle for Waterdrop Slippage Start (°) |
| Ex. 5 | 103 | 17 | 7 | 83 | 30 | 13 | 84 | 60 | 27 |
| Ex. 6 | 103 | 13 | 6 | 77 | 30 | 13 | 92 | 60 | 27 |
| Ex. 7 | 104 | 13 | 6 | 74 | 30 | 13 | 78 | 45 | 17 |

TABLE 4-continued

|  | Initial Measurements | | | Measurements After Light Resistance Test | | | Measurements After Acid Resistance Test | | |
| --- | --- | --- | --- | --- | --- | --- | --- | --- | --- |
|  | Contact Angle (°) | Waterdrop Volume to Start Slippage (μl) | Inclination Angle for Waterdrop Slippage Start (°) | Contact Angle (°) | Waterdrop Volume to Start Slippage (μl) | Inclination Angle for Waterdrop Slippage Start (°) | Contact Angle (°) | Waterdrop Volume to Start Slippage (μl) | Inclination Angle for Waterdrop Slippage Start (°) |
| Ex. 8 | 101 | 15 | 8 | 72 | 30 | 13 | 64 | 35 | 14 |
| Ex. 9 | 100 | 20 | 7 | 70 | 30 | 12 | 50 | 40 | 15 |
| Com. Ex. 3 | — | — | — | — | — | — | — | — | — |
| Com. Ex. 4 | 96 | 40 | 23 | 43 | 14 | 40 | 38 | >80 | >30 |

EXAMPLE 6

Example 5 was repeated except that henicosafluorododecyltrichlorosilane ($CF_3(CF_2)_9CH_2CH_2SiCl_3$, abbreviated as C10FASC), X88-284 (trade name) of Shin-Etsu Chemical Co., was used as the starting material of the fluoroalkylsilane.

EXAMPLE 7

Example 5 was repeated except that nonafluorohexyltrichlorosilane ($CF_3(CF_2)_3CH_2CH_2SiCl_3$, abbreviated as C4FASC), LS-912 (trade name) of Shin-Etsu Chemical Co., was used as the starting material of the fluoroalkylsilane.

EXAMPLE 8

Example 5 was repeated except that 3,3,3-trifluoropropyltrichlorosilane ($CF_3CH_2CH_2SiCl_3$, abbreviated as C1FASC), LS-160 (trade name) of Shin-Etsu Chemical Co., was used as the starting material of the fluoroalkylsilane.

EXAMPLE 9

Example 5 was repeated except that methyl-3,3,3-trifluoropropyldichlorosilane ($CF_3CH_2CH_2Si(CH_3)Cl_2$, abbreviated as C1FASMC), LS-360 (trade name) of Shin-Etsu Chemical Co., was used as the starting material of the fluoroalkylsilane.

COMPARATIVE EXAMPLE 3

0.04 g of a silanol group-terminated dimethyl silicone (average polymerization degree: 70; average molecular weight: 5,200) were dissolved in 22.36 g of ethyl acetate, followed by adding 0.05 g of heptadecafluorodecyltrichlorosilane ($CF_3(CF_2)_7CH_2CH_2SiCl_3$, abbreviated as C8FASC) and then stirring at room temperature for about 24 hr, thereby obtaining a solution. In other words, the use of the silane-coupling agent was omitted.

By substituting the obtained solution for the fluoroalkyl group-containing silanated dimethyl silicone solution, the coating liquid was prepared by the same manner as that of Example 5. Then, it was tried to form a functional film on a glass substrate in the same manner as that of Example 1. As a result, it was not possible to obtain a uniform, transparent film. Therefore, the evaluation tests were not conducted.

COMPARATIVE EXAMPLE 4

A transparent test piece was obtained by the same manner as that of Comparative Example 2 except in that the fluoroalkyl group-containing silanated dimethyl silicone solution obtained in Example 5 was dropped onto a glass substrate and that the heat treatment was conducted at 250° C. In other words, the use of the silica precursor sol was omitted.

EXAMPLE 10

(1) Preparation of a Silica Precursor Sol

A silica precursor sol was prepared in the same manner as that of Example 1.

(2) Coating Liquid Preparation

At first, 0.25 g of a 10 wt % alkoxy group-terminated, dimethyl silicone (($CH_3O)_3SiO[Si(CH_3)_2O]_{50}Si(OCH_3)_3$, its average polymerization degree: 50) solution (containing ethyl acetate as a solvent) were mixed with 7.00 g of methyl ethyl ketone, followed by stirring for about 5 min. Then, 2.00 g of the silica precursor sol were added to the mixture, followed by stirring for about 15 hr at room temperature, thereby preparing a coating liquid.

(3) Glass Substrate Washing

A float glass as the glass substrate was washed in the same manner as that of Example 1.

(4) Formation of a Functional Film

A functional film was formed on the glass substrate in the same manner as that of Example 1 except that the heat treatment of the transparent gel film was conducted at 280° C.

Evaluation Tests

The functional film formed on the glass substrate was subjected to the same evaluation tests as those of Example 5. The functional film was judged as being satisfactory in waterdrop slippage capability, if the dropped pure water is in an amount of 20 microliters or less. Furthermore, it was judged as being satisfactory in waterdrop slippage capability, if the angle is 10 degrees or less. The results are shown in Table 5.

TABLE 5

|  | Initial Measurements | | | Measurements After Light Resistance Test | | | Measurements After Acid Resistance Test | | |
| --- | --- | --- | --- | --- | --- | --- | --- | --- | --- |
|  | Contact Angle (°) | Waterdrop Volume to Start Slippage (μl) | Inclination Angle for Waterdrop Slippage Start (°) | Contact Angle (°) | Waterdrop Volume to Start Slippage (μl) | Inclination Angle for Waterdrop Slippage Start (°) | Contact Angle (°) | Waterdrop Volume to Start Slippage (μl) | Inclination Angle for Waterdrop Slippage Start (°) |
| Ex. 10 | 103 | 12 | 5 | 74 | 28 | 12 | 78 | 50 | 21 |
| Ex. 11 | 104 | 12 | 5 | 91 | 24 | 11 | 76 | 56 | 26 |
| Ex. 12 | 106 | 13 | 6 | 88 | 26 | 11 | 78 | 60 | 28 |
| Ex. 13 | 105 | 15 | 7 | 96 | 28 | 12 | 77 | 48 | 20 |
| Ex. 14 | 106 | 16 | 8 | 87 | 28 | 12 | 75 | 60 | 28 |

EXAMPLE 11

Example 10 was repeated except that the dimethyl silicone was replaced with an alkoxy group-terminated, dimethyl silicone $((CH_3O)_3SiCH_2CH_2Si(CH_3)_2O[Si(CH_3)_2O]_{75}Si(CH_3)_2CH_2CH_2Si(OCH_3)_3$, its average polymerization degree: 75).

EXAMPLE 12

Example 10 was repeated except that the dimethyl silicone was replaced with an alkoxy group-terminated, dimethyl silicone $((CH_3O)_3SiO[Si(CH_3)_2O]_{100}Si(OCH_3)_3$, its average polymerization degree: 100).

EXAMPLE 13

Example 10 was repeated except that the dimethyl silicone was replaced with an alkoxy group-terminated, dimethyl silicone $((C_2H_5O)_3SiCH_2CH_2Si(CH_3)_2O[Si(CH_3)_2O]_{150}Si(CH_3)_2CH_2CH_2Si(OC_2H_5)_3$, its average polymerization degree: 150).

EXAMPLE 14

Example 10 was repeated except that the dimethyl silicone was replaced with an alkoxy group-terminated, dimethyl silicone $((CH_3O)_3SiCH_2CH_2Si(CH_3)_2O[Si(CH_3)_2O]_{250}Si(CH_3)_2CH_2CH_2Si(OCH_3)_3$, its average polymerization degree: 250).

EXAMPLE 15

(1) Preparation of a Mixture of Fluoroalkylsilane and Alkoxy Group-terminated, Dimethyl Silicone At first, 3.70 g of a 10 wt % alkoxy group-terminated, dimethyl silicone $((CH_3O)_3SiCH_2CH_2Si(CH_3)_2O[Si(CH_3)_2O]_{100}Si(CH_3)_2CH_2CH_2Si(OCH_3)_3)$, its average polymerization degree: 100) solution (containing ethyl acetate as a solvent) were mixed with 20.00 g of ethyl acetate and 0.02 g of a 0.1 mol/l nitric acid aqueous solution, followed by stirring at room temperature for about 5 hr. Then, 4.00 g of molecular sieve (made by Union Showa Co., 4AXH-5 8×12) were added, followed by standing still at room temperature for about 20 hr to remove water from the reaction mixture. Then, 22.20 g of the resulting solution were mixed with 0.04 g of heptadecafluorodecyltrichlorosilane $[CF_3(CF_2)_7CH_2CH_2SiCl_3$, abbreviated as C8FASC], HFTCS (trade name) of Shin-Etsu Chemical Co., followed by stirring at room temperature for about 24 hr, thereby obtaining the target mixed solution.

(2) Preparation of a Silica Precursor Sol

A silica precursor sol was prepared in the same manner as that of Example 1.

(3) Coating Liquid Preparation

At first, 2.5 g of the obtained mixed solution were mixed with 7.00 g of methyl ethyl ketone and 7.00 g of isopropyl alcohol, followed by stirring for about 5 min. Then, 0.78 g of the silica precursor sol were added thereto, followed by stirring at room temperature for about 15 hr. Then, 26.5 g of methyl ethyl ketone and 26.5 g of isopropyl alcohol were added thereto, followed by stirring for 30 min, thereby obtaining a coating liquid in which the silica precursor (in terms of $SiO_2$) concentration (hereinafter $SiO_2$ concentration) is 0.1 wt %, in which the alkoxy group-terminated, dimethyl silicone concentration (hereinafter "silicone concentration") is 25.0 wt % based on the total weight of the silica precursor (in terms of $SiO_2$), and in which the fluoroalkylsilane concentration (hereinafter "FAS concentration") is 150 mol % based on the total number of moles of the alkoxy group-terminated, dimethyl silicone (see Table 6).

TABLE 6

|  | Average Polymerization Degree of Silicone | Number of End Alkoxy Groups | Fluoroalkyl-silane | SiO$_2$ Conc. (wt %) | Silicone Conc. (wt %) | FAS Conc. (mol %) |
| --- | --- | --- | --- | --- | --- | --- |
| Ex. 15 | 100 | 6 | C8FASC | 0.1 | 25.0 | 150 |
| Ex. 16 | 150 | 6 | C8FASC | 0.1 | 37.5 | 250 |
| Ex. 17 | 200 | 6 | C8FASC | 0.1 | 50.0 | 200 |
| Ex. 18 | 250 | 6 | C8FASC | 0.1 | 50.0 | 200 |
| Ex. 19 | 300 | 6 | C8FASC | 0.1 | 50.0 | 200 |
| Com. Ex. 5 | 150 | 6 | C8FASC | 0 | — | 250 |
| Com. Ex. 6 | — | — | C8FASC | 0.1 | 0 | — |
| Com. Ex. 7 | 2,500 | 4 | C8FASC | 0.1 | 37.5 | 250 |

(4) Glass Substrate Washing

A float glass as the glass substrate was washed in the same manner as that of Example 1 except that the float glass had dimensions of 300 mm×300 mm×2 mm.

(5) Formation of a Functional Film

The coating liquid prepared as above was applied by spin coating to the glass substrate washed as above, as follows. At first, the glass substrate was placed on a spin coater. While the glass substrate was rotated at a rotation speed of 100 rpm, the coating liquid was dropped in an amount of about 25-30 ml to the glass substrate. This rotation speed was maintained for 30 seconds to dry the coated film. With this, a transparent gel film was formed. Then, it was subjected to a heat treatment at 280° C. for 10 min, followed by cooling down to room temperature, then washing with water in flowing water using a flannel (made of cotton No. 300), and then air-drying, thereby forming a functional film on the glass substrate.

Evaluation Tests

The functional film formed on the glass substrate was subjected to the same evaluation tests as those of Example 1 with respect to the initial contact angle measurement and the measurement of the inclination angle to make a waterdrop start falling down. It was judged as being satisfactory if the inclination angle is 10 degrees or less. Furthermore, it was subjected to the same acid resistance test as that of Example 5. Still furthermore, it was subjected to the following ceria abrasion resistance test. The results are shown in Table 7.

In the ceria abrasion resistance test, a cotton cloth was moistened with a suspension containing 10 wt % of a glass abrasive agent, MIREK E (made by Mitsui Kinzoku Kogyo Co., dispersed in tap water. Then, the cotton cloth was rubbed against the surface of the functional film under a load of about 1.5 kg/cm$^2$. The number of reciprocations of this cotton cloth to make 70% of the total abraded area of the functional film hydrophilic from the original hydrophobic condition was recorded for evaluating the ceria abrasion resistance of the functional film. The greater the number of reciprocations in this test, the greater the durability of the functional film in hydrophobicity or waterdrop slippage capability.

TABLE 7

| | Film External Appearance | Initial Measurements Contact Angle (°) | Inclination Angle for Waterdrop Slippage Start (°) | Contact Angle After Acid Res. Test (°) | No. of Abrasion For 70% Hydrophilic |
|---|---|---|---|---|---|
| Ex. 15 | Colorless & Transparent | 105 | 8 | 97 | 35 |
| Ex. 16 | Colorless & Transparent | 104 | 8 | 99 | 35 |
| Ex. 17 | Colorless & Transparent | 103 | 8 | 93 | 35 |
| Ex. 18 | Colorless & Transparent | 106 | 8 | 89 | 35 |
| Ex. 19 | Colorless & Transparent | 105 | 7 | 88 | 35 |
| Com. Ex. 5 | Colorless & Transparent | 113 | 19 | 35 | <5 |
| Com. Ex. 6 | Colorless & Transparent | 88 | 13 | 70 | 10 |
| Com. Ex. 7 | White Haze | — | — | — | — |

EXAMPLE 16

Example 15 was repeated except that an alkoxy group-terminated, dimethyl silicone [(CH$_3$O)$_3$SiO[Si(CH$_3$)$_2$O]$_{150}$Si(OCH$_3$)$_3$] having an average polymerization degree of 150 was used instead and that there was prepared a coating liquid in which the silicone concentration was 37.5 wt % and the FAS concentration was 250 mol %.

EXAMPLE 17

Example 15 was repeated except that an alkoxy group-terminated, dimethyl silicone [(CH$_3$O)$_3$SiCH$_2$CH$_2$Si(CH$_3$)$_2$O[Si(CH$_3$)$_2$O]$_{200}$Si(CH$_3$)$_2$CH$_2$CH$_2$ $_{Si(OCH3)3}$] having an average polymerization degree of 200 was used instead and that there was prepared a coating liquid in which the silicone concentration was 50 wt % and in which the FAS concentration was 200 mol %.

EXAMPLE 18

Example 17 was repeated except that an alkoxy group-terminated, dimethyl silicone [(CH$_3$O)$_3$SiO[Si(CH$_3$)$_2$O]$_{250}$Si(OCH$_3$)$_3$] having an average polymerization degree of 250 was used instead.

EXAMPLE 19

Example 17 was repeated except that an alkoxy group-terminated, dimethyl silicone [(C$_2$H$_5$O)$_3$SiCH$_2$CH$_2$Si(CH$_3$)$_2$O[Si(CH$_3$)$_2$O]$_{300}$Si(CH$_3$)$_2$CH$_2$CH$_2$Si(OC$_2$H$_5$)$_3$] having an average polymerization degree of 300 was used instead.

COMPARATIVE EXAMPLE 5

A transparent test piece was obtained in the same manner as that of Comparative Example 2 except that 4.0 ml of the mixed solution obtained in Example 16 were dropped onto a glass substrate. In other words, the use of the silica precursor sol was omitted.

COMPARATIVE EXAMPLE 6

Example 16 was repeated except that the use of the alkoxy group-terminated, dimethyl silicone was omitted.

COMPARATIVE EXAMPLE 7

Example 16 was repeated except that an alkoxy group-terminated, dimethyl silicone [(CH$_3$O)$_2$(CH$_3$)SiCH$_2$CH$_2$Si(CH$_3$)$_2$O[Si(CH$_3$)$_2$O]$_{2500}$Si(CH$_3$)$_2$CH$_2$CH$_2$Si(CH$_3$)(OCH$_3$)$_2$] having an average polymerization degree of 2500 was used instead. As a result, it was not possible to obtain a transparent film.

EXAMPLE 20

(1) Preparation of a Mixture of Fluoroalkylsilane (Having Hydrolysable Groups at Both Ends) and Alkoxy Group-terminated, Dimethyl Silicone At first, 3.90 g of a 10 wt % alkoxy group-terminated, dimethyl silicone ((CH$_3$O)$_3$SiCH$_2$CH$_2$Si(CH$_3$)$_2$O[Si(CH$_3$)$_2$O]$_{200}$Si(CH$_3$)$_2$CH$_2$CH$_2$Si(OCH$_3$)$_3$), its average polymerization degree: 200) solution (containing ethyl acetate as a solvent) were mixed with 21.30 g of ethyl acetate and 0.02 g of a 0.1 mol/l nitric acid aqueous solution, followed by stirring at room temperature for about 5 hr. Then, 4.20 g of molecular sieve (made by Union Showa Co., 4AXH-5 8×12) were added, followed by standing still at room temperature for about 20 hr to remove water from the reaction mixture. Then, 22.20 g of the resulting solution were mixed with 0.05 g of 3,3,4,4,5,5,6,6,7,7,8,8-dodecafluoro-1,10-bis(trimethoxysilyl) decane[$(CH_3O)_3SiCH_2CH_2(CF_2)_6CH_2CH_2Si(OCH_3)_3$], followed by stirring at room temperature for about 24 hr, thereby obtaining the target mixed solution.

(2) Preparation of a Silica Precursor Sol

A silica precursor sol was prepared in the same manner as that of Example 1.

(3) Coating Liquid Preparation

At first, 1.46 g of the obtained mixed solution were mixed with 3.00 g of methyl ethyl ketone and 3.00 g of isopropyl alcohol, followed by stirring for about 5 min. Then, 0.39 g of the silica precursor sol were added thereto, followed by stirring at room temperature for about 15 hr. Then, 13.5 g of methyl ethyl ketone and 13.5 g of isopropyl alcohol were added thereto, followed by stirring for 30 min, thereby obtaining a coating liquid in which the silica precursor (in terms of $SiO_2$) concentration (hereinafter $SiO_2$ concentration) is 0.1 wt %, in which the alkoxy group-terminated, dimethyl silicone concentration (hereinafter "silicone concentration") is 50.0 wt % based on the total weight of the silica precursor (in terms of $SiO_2$), and in which the fluoroalkylsilane concentration (hereinafter "FAS concentration") is 200 mol % based on the total number of moles of the alkoxy group-terminated, dimethyl silicone (see Table 8).

TABLE 8

| | Average Polymerization Degree of Silicone | Fluoroalkylsilane | $SiO_2$ Conc. (wt %) | Silicone Conc. (wt %) | FAS Conc. (mol %) |
|---|---|---|---|---|---|
| Ex. 20 | 200 | FAS (hydrolysable groups at both ends) | 0.1 | 50.0 | 200 |
| Ex. 21 | 150 | FAS (hydrolysable groups at both ends) | 0.1 | 62.5 | 400 |

(4) Glass Substrate Washing

A float glass as the glass substrate was washed in the same manner as that of Example 15.

(5) Formation of a Functional Film

A functional film was formed on the glass substrate in the same manner as that of Example 15. The obtained film was colorless and transparent.

Evaluation Tests

The functional film formed on the glass substrate was subjected to the same evaluation tests as those of Example 1 with respect to the initial contact angle measurement and the measurement of the inclination angle to make a waterdrop start falling down. It was judged as being satisfactory if the inclination angle is 10 degrees or less. Furthermore, it was subjected to the same acid resistance and light resistance tests as those of Example 5. The results are shown in Table 9.

TABLE 9

| | Initial Measurements | | Measurements after Acid Res. Test | | Measurements after Light Res. Test | |
|---|---|---|---|---|---|---|
| | Contact Angle (°) | Inclination Angle for Waterdrop Slippage Start (°) | Contact Angle (°) | Inclination Angle for Waterdrop Slippage Start (°) | Contact Angle (°) | Inclination Angle for Waterdrop Slippage Start (°) |
| Ex. 20 | 106 | 6 | 81 | 17 | 80 | 18 |
| Ex. 21 | 106 | 8 | 86 | 14 | 84 | 15 |

EXAMPLE 21

Example 20 was repeated except in that an alkoxy group-terminated, dimethyl silicone (($CH_3O)_3SiCH_2CH_2Si(CH_3)_2O[Si(CH_3)_2O]_{150}Si(CH_3)_2CH_2CH_2Si(OCH_3)_3$), its average polymerization degree: 150) was used instead and that there was prepared a coating liquid in which the silicone concentration was 62.5 wt % and in which the FAS concentration was 400 mol %. The obtained film was colorless and transparent.

The entire contents of each of Japanese Patent Application Nos. 2001-099491 (filed Mar. 30, 2001), 2001-099492 (filed Mar. 30, 2001), 2001-260705 (filed Aug. 30, 2001), 2002-005774 (filed Jan. 15, 2002), 2002-037626 (Feb. 15, 2002), and 2002-058562 (Mar. 5, 2002), of which priorities are claimed in the application, are incorporated herein by reference.

What is claimed is:

1. An article superior in slipping a waterdrop down a surface of said article, said article comprising:
    a substrate;
    a functional film formed on a surface of said substrate, and
    an underlayer arranged between said substrate and said functional film, said underlayer comprising a metal oxide;
    wherein said article is prepared by a process comprising the steps of:
    (a) subjecting an alkoxysilane to hydrolysis and polycondensation in the presence of an acid catalyst, thereby preparing a silica precursor sol for forming a silica matrix in the functional film;
    (b) mixing together an alkoxy group-terminated, dimethyl silicone represented by the formula [1] and said silica precursor sol, thereby preparing a coating liquid;

[1]

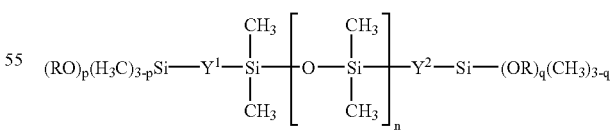

where each of $Y^1$ and $Y^2$ is independently a bivalent alkylene group, —$(CH_2)_i$—NH—CO—O—, or oxygen; R is a monovalent alkyl group; i is 0 or a positive integer; each of p and q is an integer of 1-3 independently; and n is an integer of not greater than 2,000,
    (c) applying said coating liquid to said surface of said substrate, thereby forming thereon a precursory film; and (d) drying said precursory film into said functional film,
wherein said alkoxy group-terminated, dimethyl silicone of step (b) has an average polymerization degree of 5-400.

2. An article according to claim 1, wherein said substrate is an automotive window glass substrate.

3. A process for producing an article superior in slipping a waterdrop down a surface of said article, said article comprising:
a substrate; and
a transparent functional film formed on a surface of said substrate, said process comprising the steps of:
(a) subjecting an alkoxysilane to hydrolysis and polycondensation in the presence of an acid catalyst, thereby preparing a silica precursor sol for forming a silica matrix in the functional film;
(b) mixing together an alkoxy group-terminated, dimethyl silicone represented by the formula [1] having at least three alkoxy groups in the molecule and said silica precursor sol, thereby preparing a coating liquid;

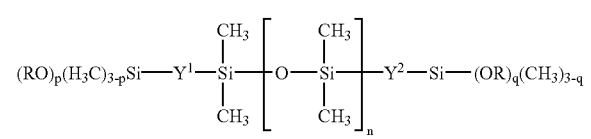
[1]

where each of $Y^1$ and $Y^2$ is independently a bivalent alkylene group, —$(CH_2)_i$—NH—CO—O—, or oxygen; R is a monovalent alkyl group; i is 0 or a positive integer; each of p and q is an integer of 1-3 independently; and n is an integer of not greater than 2,000, said process comprising:
(c) applying said coating liquid to said surface of said substrate, thereby forming thereon a precursory film; and
(d) drying said precursory film into said transparent functional film.

4. A process according to claim 3, wherein said drying of step (d) is conducted at a temperature of not higher than 600° C.

5. A process according to claim 3, wherein said acid catalyst is hydrochloric acid, nitric acid, or acetic acid.

6. A process according to claim 3, wherein said alkoxy group-terminated, dimethyl silicone is represented by the formula [4]

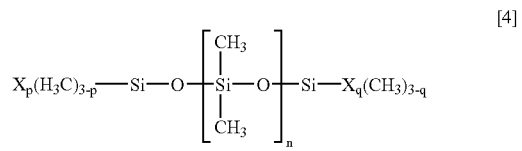
[4]

where p, q and n are defined as above, and X is —OR or —R'Si(OR)$_r$(CH$_3$)$_{3-r}$ where R is defined as above, R' is a bivalent alkylene group, and r is an integer of 1-3.

7. A process according to claim 3, wherein said alkoxy group-terminated, dimethyl silicone of step (b) has an average polymerization degree of 5-400.

8. A process according to claim 3, wherein said alkoxy group-terminated, dimethyl silicone of step (b) is in an amount of 1-300 wt % based on a weight of said silica matrix.

9. A process according to claim 3, wherein R of the formula [1] is a methyl or ethyl group.

10. A process according to claim 6, wherein said alkoxy group-terminated, dimethyl silicone has at least four alkoxy groups in the molecule.

11. A process according to claim 3, wherein said substrate is an automotive window glass substrate.

12. An article superior in slipping a waterdrop down a surface of said article, said article comprising:
a substrate; and
a functional film formed on a surface of said substrate, wherein said article is prepared by a process comprising the steps of:
(a) reacting an alkoxy group-terminated, dimethyl silicone represented by the formula [1], with a fluoroalkylsilane represented by the formula [2], thereby synthesizing a fluoroalkyl group-containing dimethyl silicone;

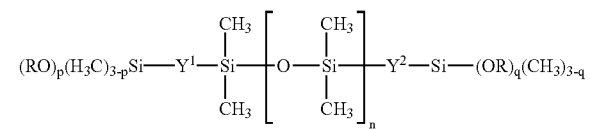
[1]

where each of $Y^1$ and $^2$ is independently a bivalent alkylene group, —$(CH_2)_i$—NH—CO—O—, or oxygen; R is a monovalent alkyl group; i is 0 or a positive integer; each of p and q is an integer of 1-3 independently; and n is an integer of not greater than 2,000,

$CF_3(CF_2)_jCH_2CH_2Si(CH_3)_{3-k}Z_k$ [2]

where j is an integer of 0-11, k is an integer of 1-3, and Z is a hydrolysable group,
(b) subjecting an alkoxysilane to hydrolysis and polycondensation, thereby preparing a silica precursor sol for forming a silica matrix in the functional film;
(c) mixing together the fluoroalkyl group-containing dimethyl silicone of the step (a) and the silica precursor sol of the step (b), thereby preparing a coating liquid;
(d) applying the coating liquid to the surface of the substrate, thereby forming thereon a precursory film; and
(e) drying the precursory film into the functional film.

13. An article according to claim 12, wherein said alkoxy group-terminated, dimethyl silicone of the step (a) is a reaction product prepared by reacting a silanol group-terminated, dimethyl silicone represented by the formula [5] with an alkoxysilane represented by the formula [6],

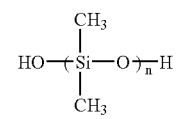
[5]

where n is defined as in the formula [1],

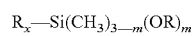
$R_x$—Si(CH$_3$)$_{3-m}$(OR)$_m$ [6]

where m is an integer of 1-3, OR is an alkoxy group, and Rx is a monovalent, straight-chain, organic group terminated with an isocyanate group.

14. An article superior in slipping a waterdrop down a surface of said article, said article comprising:
a substrate; and a functional film formed on a surface of said substrate,
wherein said article is prepared by a process comprising the steps of:
(a) subjecting an alkoxysilane to hydrolysis and polycondensation, thereby preparing a silica precursor sol for forming a silica matrix in the functional film;
(b) mixing together an alkoxy group-terminated, dimethyl silicone represented by the formula [1], a fluoroalkylsilane represented by the formula [2] or [3], and the silica precursor sol of the step (a), thereby preparing a coating liquid;

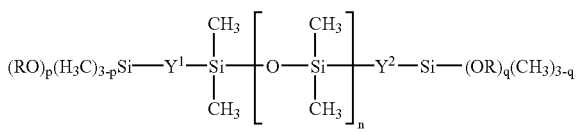
[1]

where each of $Y^1$ and $Y^2$ is independently a bivalent alkylene group, $-(CH_2)_i-NH-CO-O-$, or oxygen; R is a monovalent alkyl group; i is 0 or a positive integer; each of p and q is an integer of 1-3 independently; and n is an integer of not greater than 2,000,

[2]

where j is an integer of 0-11, k is an integer of 1-3, and Z is a hydrolysable group,

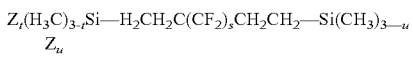
[3]

where s is an integer of 0-12, each of t and u is independently an integer of 1-3, and Z is a hydrolysable group,
(c) applying the coating liquid to the surface of the substrate, thereby forming thereon a precursory film; and
(d) drying the precursory film into the functional film.

15. An article according to claim 14, wherein said alkoxy group-terminated, dimethyl silicone of the step (b) is represented by the formula [4]:

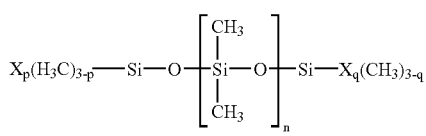
[4]

where p, q and n are defined as above, and X is $-OR$ or $-R'Si(OR)_r(CH_3)_{3-r}$ where R is defined as above, R' is a bivalent alkylene group, and r is an integer of 1-3,
wherein said fluoroalkylsilane of the step (b) is represented by the formula [2].

16. An article according to claim 14, wherein said fluoroalkylsilane of the step (b) is represented by the formula [3].

17. An article according to claim 14, wherein said alkoxy group-terminated, dimethyl silicone of the step (b) is represented by the formula [4]:

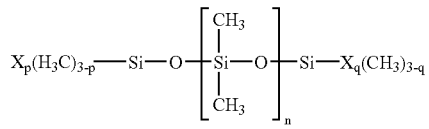
[4]

where p, q and n are defined as above, and X is $-OR$ or $-R'Si(OR)_r(CH_3)_{3-r}$ where R is defined as above, R' is a bivalent alkylene group, and r is an integer of 1-3,
wherein said fluoroalkylsilane of the step (b) is represented by the formula [3].

18. An article according to claim 14, wherein said fluoroalkylsilane of the step (b), which is represented by the formula [3], comprises at least three of said hydrolysable groups.

19. An article according to claim 14, wherein said fluoroalkylsilane of the step (b) is in an amount of 10-3,000 mol % based on a total number of moles of said alkoxy-terminated, dimethyl silicone.

20. An article according to claim 14, wherein said alkoxy-terminated, dimethyl silicone and said fluoroalkylsilane are bonded together.

21. A process for producing an article superior in slipping a waterdrop down a surface of said article, said article comprising:
a substrate; and
a functional film formed on a surface of said substrate, said process comprising the steps of:
(a) reacting an alkoxy group-terminated, dimethyl silicone represented by the formula [1], with a fluoroalkylsilane represented by the formula [2], thereby synthesizing a fluoroalkyl group-containing dimethyl silicone;

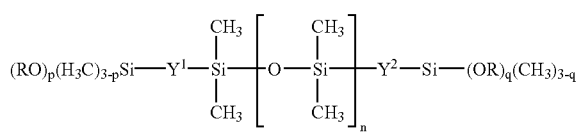
[1]

where each of $Y_1$ and $Y_2$ is independently a bivalent alkylene group, $-(CH_2)_i-NH-CO-O-$, or oxygen; R is a monovalent alkyl group; i is 0 or a positive integer; each of p and q is an integer of 1-3 independently; and n is an integer of not greater than 2,000,

[2]

where j is an integer of 0-11, k is an integer of 1-3, and Z is a hydrolysable group,
(b) subjecting an alkoxysilane to hydrolysis and polycondensation, thereby preparing a silica precursor sol for forming a silica matrix in the functional film;
(c) mixing together the fluoroalkyl group-containing dimethyl silicone of the step (a) and the silica precursor sol of the step (b), thereby preparing a coating liquid;
(d) applying the coating liquid to the surface of the substrate, thereby forming thereon a precursory film; and
(e) drying the precursory film into the functional film.

22. A process according to claim 21, wherein said alkoxy group-terminated, dimethyl silicone of the step (a) is prepared by reacting a silanol group-terminated, dimethyl silicone represented by the formula [5] with an alkoxysilane represented by the formula [6],

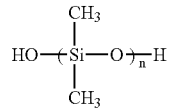   [5]

where n is defined as in the formula [1], $R_x\text{—}Si(CH_3)_{3-m}(OR)_m$   [6]

where m is an integer of 1-3, OR is an alkoxy group, and Rx is a monovalent, straight-chain, organic group terminated with an isocyanate group.

23. A process according to claim 21, wherein the step (b) is conducted in the presence of an acid catalyst.

24. A process according to claim 23, wherein said acid catalyst is hydrochloric acid, nitric acid, or acetic acid.

25. A process for producing an article superior in slipping a waterdrop down a surface of said article, said article comprising:
 a substrate; and
 a functional film formed on a surface of said substrate, said process comprising the steps of:
 (a) subjecting an alkoxysilane to hydrolysis and polycondensation, thereby preparing a silica precursor sol for forming a silica matrix in the functional film;
 (b) mixing together an alkoxy group-terminated, dimethyl silicone represented by the formula [1], a fluoroalkylsilane represented by the formula [2] or [3], and the silica precursor sol of the step (a), thereby preparing a coating liquid;

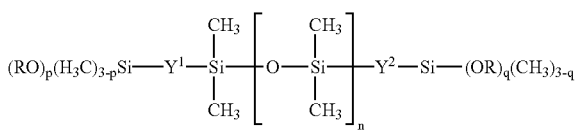   [1]

where each of $Y_1$ and $Y_2$ is independently a bivalent alkylene group, —$(CH_2)_i$—NH—CO—O—, or oxygen; R is a monovalent alkyl group; i is 0 or a positive integer; each of p and q is an integer of 1-3 independently; and n is an integer of not greater than 2,000, $CF_3(CF_2)_jCH_2CH_2Si(CH_3)_{3-k}Z_k$   [2]

where j is an integer of 0-11, k is an integer of 1-3, and Z is a hydrolysable group,

   [3]

where s is an integer of 0-12, each of t and u is independently an integer of 1-3, and Z is a hydrolysable group,
 (c) applying the coating liquid to the surface of the substrate, thereby forming thereon a precursory film; and
 (d) drying the precursory film into the functional film.

26. A process according to claim 25, wherein said alkoxy group-terminated, dimethyl silicone of the step (b) is represented by the formula [4]:

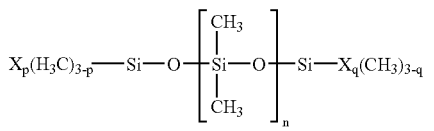   [4]

where p, q and n are defined as above, and X is —OR or —R'Si(OR)$_j$(CH$_3$)$_{3-r}$ where R is defined as above, R' is a bivalent alkylene group, and r is an integer of 1-8.

27. A process according to claim 25, wherein said fluoroalkylsilane of the step (b) is represented by the formula [3].

28. A process according to claim 25, wherein said fluoroalkylsilane of the step (b), which is represented by the formula [3], comprises at least three of said hydrolysable groups.

29. A process according to claim 25, wherein said fluoroalkylsilane of the step (b) is in an amount of 10-3,000 mol % based on a total number of moles of said alkoxy-terminated, dimethyl silicone.

30. A coating liquid for producing an article superior in slipping a waterdrop down a surface of said article, said article comprising:
 a substrate; and
 a functional film formed on a surface of said substrate,
 wherein said coating liquid is prepared by a process comprising the steps of:
 (a) reacting an alkoxy group-terminated, dimethyl silicone represented by the formula [1], with a fluoroalkylsilane represented by the formula [2], thereby synthesizing a fluoroalkyl group-containing dimethyl silicone;

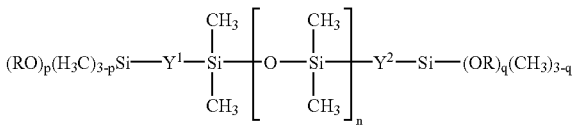   [1]

where each of $Y^1$ and $Y^2$ is independently a bivalent alkylene group, —$(CH_2)_i$—NH—CO—O—, or oxygen; R is a monovalent alkyl group; i is 0 or a positive integer; each of p and q is an integer of 1-3 independently; and n is an integer of not greater than 2,000, $CF_3(CF_2)_jCH_2CH_2Si(CH_3)_{3-k}Z_k$   [2]

where j is an integer of 0-11, k is an integer of 1-3, and Z is a hydrolysable group,
 (b) subjecting an alkoxysilane to hydrolysis and polycondensation, thereby preparing a silica precursor sol for forming a silica matrix in the functional film; and
 (c) mixing together the fluoroalkyl group-containing dimethyl silicone of the step (a) and the silica precursor sol of the step (b), thereby preparing the coating liquid.

31. A coating liquid for producing an article superior in slipping a waterdrop down a surface of said article, said article comprising:
 a substrate; and
 a functional film formed on a surface of said substrate,
 wherein said coating liquid is prepared by a process comprising the steps of:
 (a) subjecting an alkoxysilane to hydrolysis and polycondensation, thereby preparing a silica precursor sol for forming a silica matrix in the functional film;

(b) mixing together an alkoxy group-terminated, dimethyl silicone represented by the formula [1], a fluoroalkylsilane represented by the formula [2] or [3], and the silica precursor sol of the step (a), thereby preparing the coating liquid;

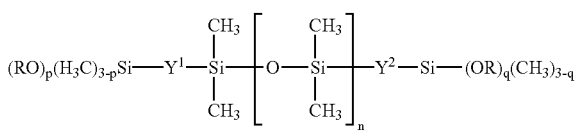

[1]

where each of $Y^1$ and $Y^2$ is independently a bivalent alkylene group, $-(CH_2)_i-NH-CO-O-$, or oxygen; R is a monovalent alkyl group; i is 0 or a positive integer; each of p and q is an integer of 1-3 independently; and n is an integer of not greater than 2,000,

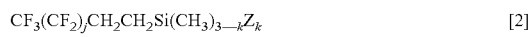

[2]

where j is an integer of 0-11, k is an integer of 1-3, and Z is a hydrolysable group,

[3]

where s is an integer of 0-12, each of t and u is independently an integer of 1-3, and Z is a hydrolysable group.

32. An article superior in slipping a waterdrop down a surface of said article, said article comprising:
a substrate; and
a transparent functional film formed on a surface of said substrate,
wherein said article is prepared by a process comprising the steps of:
(a) subjecting an alkoxysilane to hydrolysis and polycondensation in the presence of an acid catalyst, thereby preparing a silica precursor sol for forming a silica matrix in the functional film;
(b) mixing together an alkoxy group-terminated, dimethyl silicone represented by the formula [1] having at least three alkoxy groups in the molecule and said silica precursor sol, thereby preparing a coating liquid;

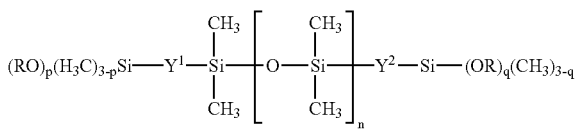

[1]

where each of $Y^1$ and $Y^2$ is independently a bivalent alkylene group, $-(CH_2)_i-NH-CO-O-$, or oxygen; R is a monovalent alkyl group; i is 0 or a positive integer; each of p and q is an integer of 1-3 independently; and n is an integer of not greater than 2,000,
(c) applying said coating liquid to said surface of said substrate, thereby forming thereon a precursory film; and
(d) drying said precursory film into said transparent functional film,
wherein said alkoxy group-terminated, dimethyl silicone of step (b) is in an amount of 1-300 wt % based on a weight of said silica matrix.

33. An article according to claim 32, wherein said substrate is an automotive window glass substrate.

34. A process for producing an article superior in slipping a waterdrop down a surface of said article, said article comprising:
a substrate; and
a functional film formed on a surface of said substrate, said process comprising the steps of:
(a) subjecting an alkoxysilane to hydrolysis and polycondensation in the presence of an acid catalyst, thereby preparing a silica precursor sol for forming a silica matrix in the functional film;
(b) mixing together an alkoxy group-terminated, dimethyl silicone represented by the formula [1] and said silica precursor sol, thereby preparing a coating liquid;

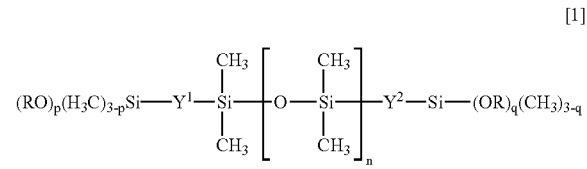

[1]

where each of $Y^1$ and $Y^2$ is independently a bivalent alkylene group, $-(CH_2)_i-NH-CO-O-$, or oxygen; R is a monovalent alkyl group; i is 0 or a positive integer; each of p and q is an integer of 1-3 independently; and n is an integer of not greater than 2,000, said process comprising:
(c) applying said coating liquid to said surface of said substrate, thereby forming thereon a precursory film; and
(d) drying said precursory film into said functional film,
wherein said alkoxy group-terminated, dimethyl silicone of the step (b) is a reaction product prepared by reacting a silanol group-terminated, dimethyl silicone represented by the formula [5] with an alkoxysilane represented by the formula [6],

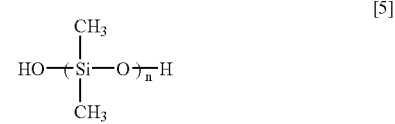

[5]

where n is defined as above,

[6]

where m is an integer of 1-3, OR is an alkoxy group, and Rx is a monovalent, straight-chain, organic group terminated with an isocyanate group.

35. A process according to claim 34, wherein said R in the formula [6] is a methyl, ethyl, or propyl group.

36. A process according to claim 34, wherein said silanol group-terminated, dimethyl silicone has an average polymerization degree of 10-300.

37. A process according to claim 3, wherein said alkoxysilane of step (a) is a tetraalkoxysilane.

38. An article according to claim 32, wherein said alkoxysilane of step (a0 is a tetraalkoxysilane.

* * * * *